United States Patent
Lee et al.

(10) Patent No.: US 7,739,890 B2
(45) Date of Patent: Jun. 22, 2010

(54) WASHING AND/OR DRYING MACHINE HAVING A DAMPER CONNECTING STRUCTURE INCLUDING A REINFORCING PORTION

(75) Inventors: Hong Yeol Lee, Yongin-si (KR); Hyoung Hoon Roh, Suwon-si (KR); Yoon Seok Yang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 703 days.

(21) Appl. No.: 11/509,627

(22) Filed: Aug. 25, 2006

(65) Prior Publication Data
US 2007/0044518 A1 Mar. 1, 2007

(30) Foreign Application Priority Data
Sep. 1, 2005 (KR) .................. 10-2005-0081292

(51) Int. Cl.
*D06F 37/20* (2006.01)
(52) U.S. Cl. ....................................... 68/23.1
(58) Field of Classification Search ............. 68/23.1, 68/23.3
See application file for complete search history.

(56) References Cited

U.S. PATENT DOCUMENTS

| | | | | |
|---|---|---|---|---|
| 3,039,613 A | * | 6/1962 | Hubbard | 210/364 |
| 3,103,112 A | * | 9/1963 | Behrens et al. | 68/18 R |
| 3,321,940 A | * | 5/1967 | Brucken | 68/23.3 |
| 3,516,174 A | * | 6/1970 | Behrens | 34/534 |
| 4,991,412 A | * | 2/1991 | Bauer et al. | 68/23.1 |
| 5,335,522 A | | 8/1994 | Stadelmann et al. | 68/23.1 |
| 5,548,979 A | * | 8/1996 | Ryan et al. | 68/23.2 |
| 6,574,997 B1 | * | 6/2003 | Mayer et al. | 68/23.1 |
| 2004/0025545 A1 | * | 2/2004 | Chang | 68/23.1 |
| 2004/0148976 A1 | * | 8/2004 | Kim et al. | 68/23.1 |
| 2004/0244436 A1 | * | 12/2004 | Park et al. | 68/12.26 |
| 2005/0193779 A1 | * | 9/2005 | Kwon et al. | 68/23.1 |

FOREIGN PATENT DOCUMENTS

| | | | |
|---|---|---|---|
| JP | 05-253387 | | 10/1993 |
| JP | 10-216393 | | 8/1998 |
| JP | 11-114280 | | 4/2006 |
| KR | 10-036691 | | 1/2000 |
| KR | 20050079771 | * | 8/2005 |

OTHER PUBLICATIONS

Extended European Search Report dated Apr. 16, 2008 in corresponding European Patent Application No. 06119691.1.

* cited by examiner

*Primary Examiner*—Joseph L Perrin
(74) *Attorney, Agent, or Firm*—Staas & Halsey LLP

(57) ABSTRACT

A drum type washing machine capable of preventing/reducing damage to a damper fixing unit provided on a bottom plate for securing a damper at a fixed position by a reinforced rigidity of the damper fixing unit. The drum type washing machine includes a water tub installed in a body, at least one damper to support the water tub, and a damper fixing unit provided on the bottom plate of the body to secure the damper at a fixed position. The damper fixing unit is formed via cutting of the bottom plate and has a reinforced rigidity by a reinforcing portion formed around each cut portion of the bottom plate.

19 Claims, 4 Drawing Sheets

WASHING AND/OR DRYING MACHINE HAVING A DAMPER CONNECTING STRUCTURE INCLUDING A REINFORCING PORTION

CROSS-REFERENCE TO RELATED APPLICATION

This application claims the benefit of Korean Patent Application No. 2005-0081292, filed on Sep. 1, 2005 in the Korean Intellectual Property Office, the disclosure of which is incorporated herein by reference.

BACKGROUND OF THE INVENTION

1. Field of the Invention

The present invention relates to a washing machine, and, more particularly, to a washing machine capable of preventing damage to a damper fixing unit to which a damper is coupled.

2. Description of the Related Art

Japanese Patent Publication No. Heisei 5-253387 discloses a drum type washing machine comprising at least one damper for supporting a lower portion of a water tub and reducing vibration and shaking caused in the water tub. The damper has an upper end coupled to the lower portion of the water tub and a lower end secured to a bottom plate of a washing machine body, and acts to reduce vibration and shaking caused in the water tub by a flexible action thereof.

The disclosed washing machine comprises a damper fixing unit disposed on the bottom plate of the body and adapted to secure the lower end of the damper. The lower end of the damper and the damper fixing unit are coupled to each other by use of fixing bolts.

The damper fixing unit is conventionally attached to the bottom plate of the body by welding, or formed by cutting a portion of the bottom plate. For the fastening of the fixing bolts penetrated through the lower end of the damper, the damper fixing unit includes first and second fixing pieces extending from the bottom plate of the body to opposite sides of the lower end of the damper, respectively, each fixing piece having a bolt penetrating hole.

The damper fixing unit of the conventional washing machine having the above described configuration, however, has a problem in that a portion thereof connected to the bottom plate of the body is fragile, and therefore, the damper fixing unit and the peripheral region thereof may be damaged by repetitive vibration and shock applied thereto after the lapse of a long time.

In particular, in a case where the damper fixing unit is formed by cutting a portion of the bottom plate of the body, a boundary between the cut portion of the bottom plate and the damper fixing unit is fragile, thus having a high risk of damage.

SUMMARY OF THE INVENTION

The present invention has been made in order to solve the above problems. It is an aspect of the invention to provide a drum type washing machine capable of preventing damage to a damper fixing unit by a reinforced strength of the damper fixing unit.

Consistent with one aspect, an exemplary embodiment of the present invention provides a drum type washing machine comprising a body, a water tub installed in the body, at least one damper to support the water tub, and a damper fixing unit arranged on a bottom plate of the body to secure the damper at a fixed position, wherein the damper fixing unit is formed via cutting of the bottom plate, and has a reinforced rigidity by a reinforcing portion formed around each cut portion of the bottom plate.

The reinforcing portion may be formed by bending a peripheral portion around the cut portion to have a height larger than a thickness of the bottom plate, and may be integrally formed with the damper fixing unit.

The reinforcing portion mat be bent from a periphery of the cut portion to protrude upward from an upper surface of the bottom plate, and may be integrally formed with the damper fixing unit.

The damper fixing unit may comprise first and second fixing pieces, which are cut from the bottom plate and bent upward to support opposite sides of a lower end of the damper, each fixing piece having a hole for the penetration of a fixing bolt.

Reinforcing ribs may be formed at connecting portions between the first and second fixing pieces and the bottom plate, respectively Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
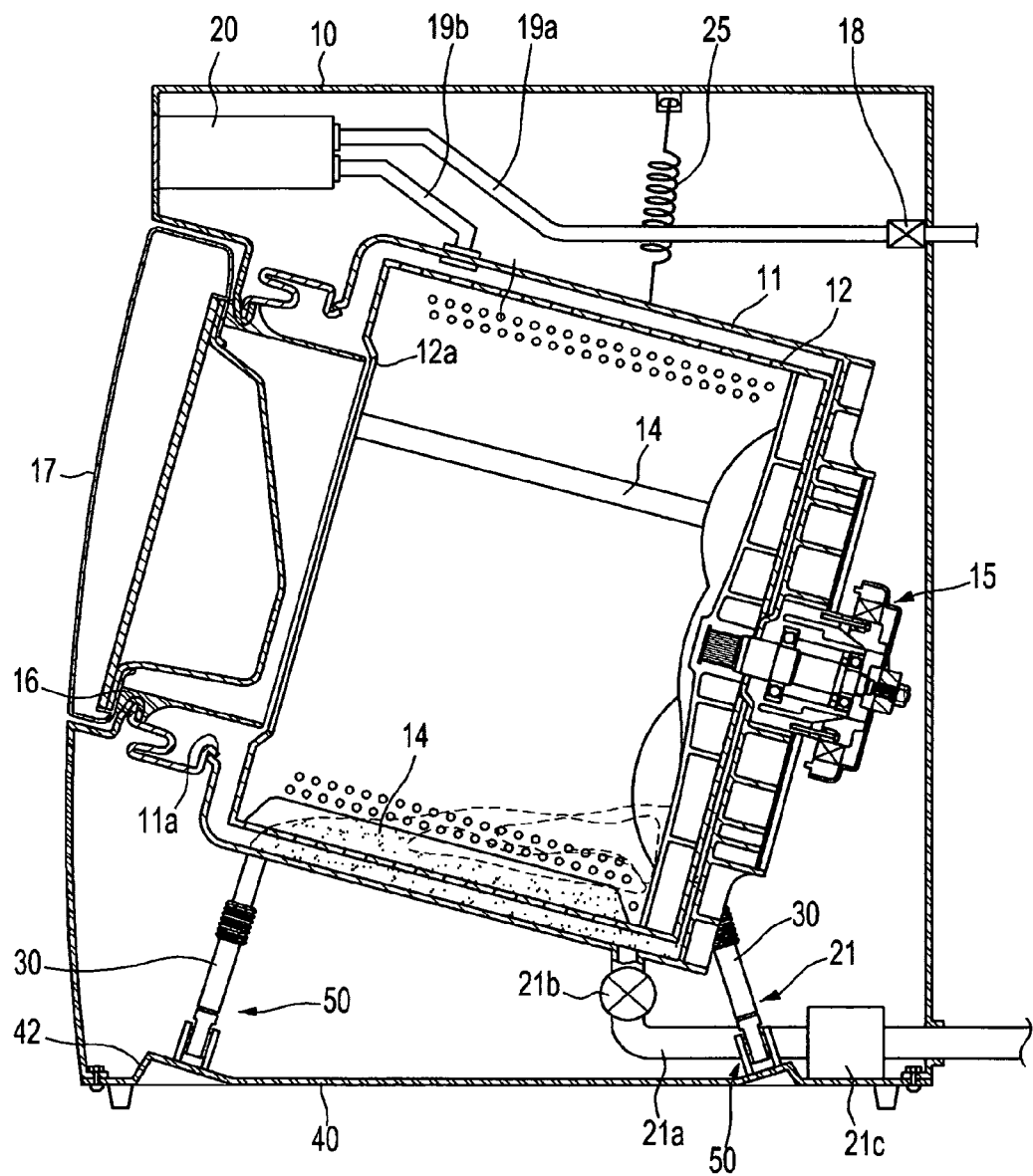
FIG. 1 is a sectional view showing the configuration of a washing machine consistent with the present invention.

Reference will now be made in detail to exemplary embodiment of the present invention, examples of which are illustrated in the accompanying drawings, wherein like reference numerals refer to like elements throughout. The embodiments are described below to explain the present invention by referring to the figures.

Referring to FIG. 1 illustrating a drum type washing machine consistent with the present invention, the washing machine comprises a drum-shaped water tub 11 installed in a body 10 to receive wash water therein, and a rotating drum 12 rotatably installed in the water tub 11.

The water tub 11 is obliquely installed in the body 10 such that a front surface portion of the water tub 11 having an entrance opening 11a is positioned higher than a rear surface portion of the water tub 11. The rotating drum 12 is also obliquely installed in the water tub 11 by the same inclination as that of the water tub 11. To rotatably support the rotating drum 12, a rotary shaft 13 is coupled to the center of a rear surface portion of the rotating drum 12 while being rotatably supported by the rear surface portion of the water tub 11. A motor 15 is mounted to the rear surface portion of the water tub 11 to rotate the rotating drum 12. The rotating drum 12 is perforated, throughout a peripheral portion thereof, with a plurality of holes 12b for the passage of wash water. Also, a plurality of lifters 14 are provided at an inner peripheral surface of the rotating drum 12 and adapted to cause lifting and falling of laundry during rotation of the rotating drum 12.

The body 10 is formed, at a front surface portion thereof, with an entrance opening 16 to put or take laundry into or out of the rotating drum 12. The entrance opening 16 is positioned to correspond to the entrance opening 11a of the water tub 11 and an entrance opening 12a of the rotating drum 12. A door 17 is provided to open and close the entrance opening 16.

A water supply control valve 18 and water supply pipes 19a and 19b, which are used to control the supply of wash water, and a detergent supply device 20, which is used to supply a detergent into the water tub 11 during a water supply course, are arranged above the water tub 11. Also, a drainage device 21, which is used to drain the water inside the water tub 11, is arranged below the water tub 11. The drainage device 21 includes a drain pipe 21a, drain valve 21b and drain motor 21c.

Figure 2:
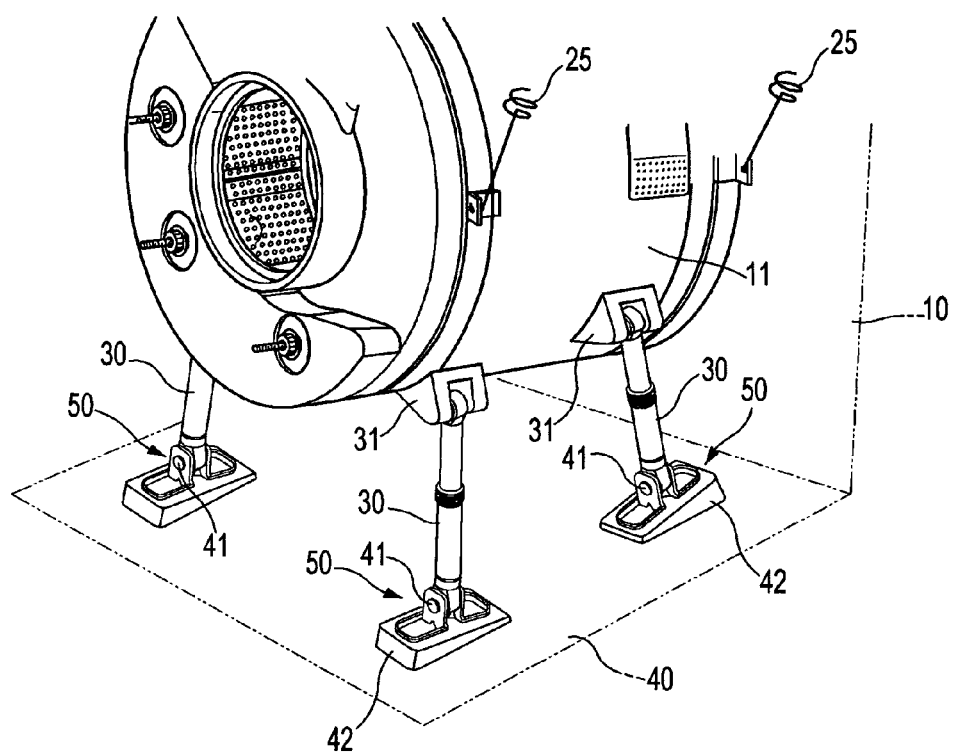
FIG. 2 is a perspective view showing the configuration of a damper included in the washing machine consistent with the present invention.

As shown in FIG. 2, the water tub 11 is supported by use of a plurality of dampers 30 supporting a lower portion of the water tub 11 and a plurality of shock-absorbing springs 25 supporting an upper portion of the water tub 11. As a result of supporting the water tub 11 with the dampers 30 and shock-absorbing springs 25, it is possible to prevent/reduce shaking and vibration of the water tub 11 caused during a wash course from being transmitted to the body 10.

Each of the dampers 30, as shown in FIG. 2, has an upper end to be secured, by use of a fixing bolt (not shown), to an associated one of damper fixing members 31 arranged on an outer peripheral surface of the water tub 11. Also, a lower end of each damper 30, as shown in FIGS. 1 and 3, is secured, by use of a fixing bolt 41, to an associated one of damper fixing units 50 arranged on a bottom plate 40 of the body 10.

Figure 3:
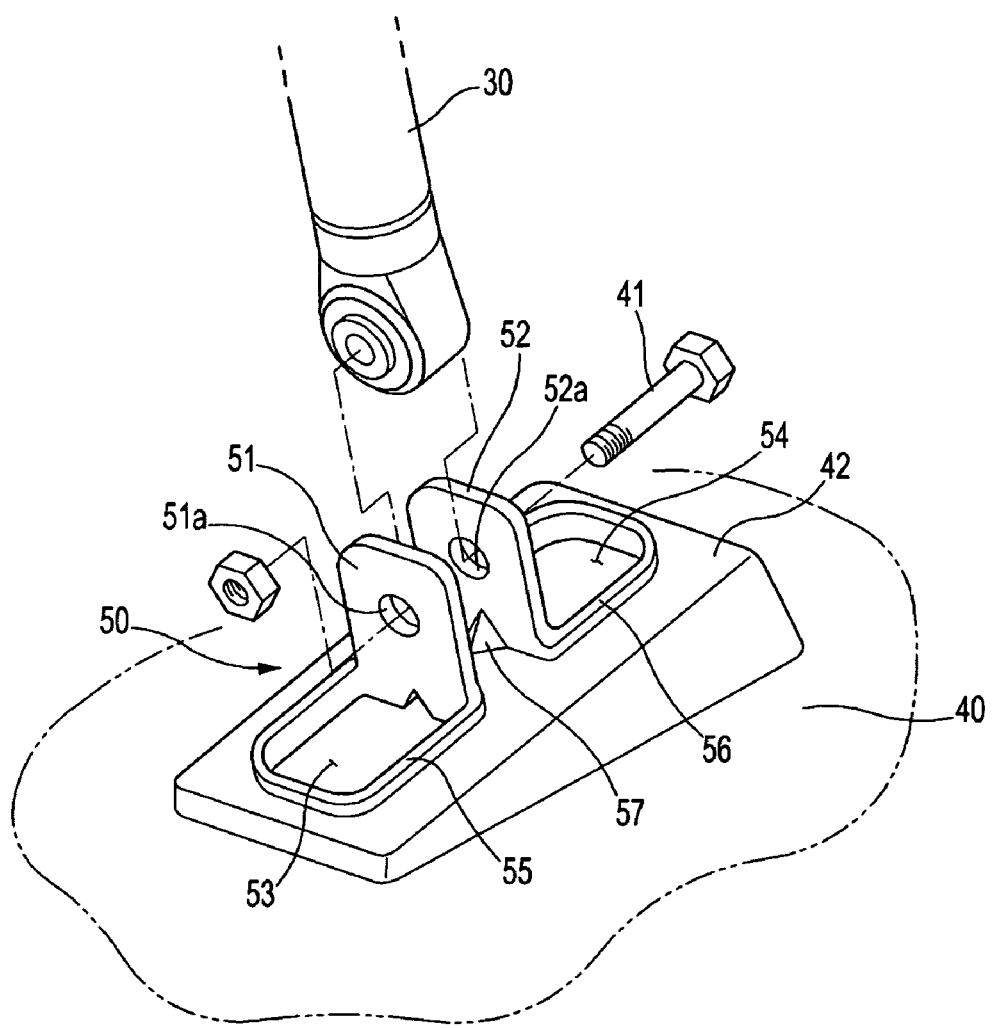
FIG. 3 is a perspective view showing the configuration of a damper fixing unit included in the washing machine consistent with the present invention.
Figure 4:
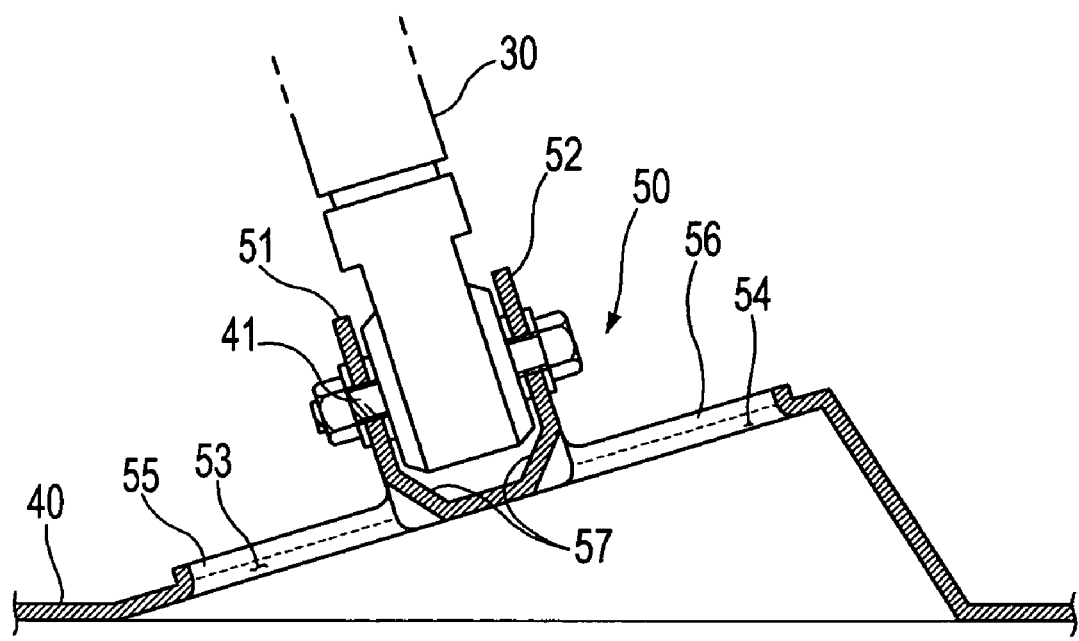
FIG. 4 is a sectional view showing the damper fixing unit of FIG. 3.

Each damper fixing unit 50 on the bottom plate 40 of the body 10, as shown in FIGS. 3 and 4, has a first fixing piece 51 and a second fixing piece 52. Specifically, the first and second fixing pieces 51 and 52 are cut from an obliquely raised supporting portion 42 of the bottom plate 40 and bent upward to support opposite sides of a lower end of the associated damper 30. The first and second fixing pieces 51 and 52 are perforated with holes 51a and 52a, respectively, to allow an associated one of the fixing bolts 41, which is used to secure the lower end of the damper 30 to the damper fixing unit 50, to penetrate and supported by the holes 51a and 52a.

To provide the first fixing piece 51 and second fixing piece 52 with a reinforced strength, reinforcing portions 55 and 56 are provided along peripheries of cut portions 53 and 54 of the bottom plate 40 remaining after cutting the fixing and second fixing pieces 51 and 52 form the bottom plate 40. The reinforcing portions 55 and 56, as shown in FIG. 3, are formed by bending peripheral portions around the cut portions 53 and 54 of the bottom plate 40 to protrude upward from an upper surface of the supporting portion 42. The reinforcing portions 55 and 56 are integrally connected to lower end portions of the first and second fixing pieces 51 and 52. Specifically, the reinforcing portions 55 and 56 are continuously formed along the peripheries of the cut portions 53 and 54 to have a larger height than the thickness of the bottom plate 40 while being connected to the first and second fixing pieces 51 and 52, respectively. In an alternate embodiment, the height of the reinforcing portions 53 and 54 may be substantially equal to the thickness of the bottom plate 40. In another alternate embodiment, the reinforcing portions 55 and 56 are provided along a portion of the peripheries of the cut portions 53 and 54.

Provision of the reinforcing portions 55 and 56 can reinforce rigidity of the bottom plate 40 around the cut portions 53 and 54. Accordingly, even if a relatively large load or shock is applied to the first and second fixing pieces 51 and 52 by the damper 30, there is little risk of damage to peripheral regions around the cut portions 53 and 54. Furthermore, by integrally connecting the reinforcing portions 55 and 56 to opposite sides of the respective lower end portions of the first and second fixing pieces 51 and 52 connected to the bottom plate 40, the rigidity of the first and second fixing pieces 51 and 52 can be significantly reinforced.

The connecting portions between the first and second fixing pieces 51 and 52 and the bottom plate 40, more particularly, the bent portions of the first and second fixing pieces 51 and 52, are centrally provided with reinforcing ribs 57 to achieve an increase in the rigidity of the connecting portions. The reinforcing ribs 57 in the present embodiment is shaped in the form of a pyramid however, various other shapes such as quarter of a sphere or half cylinder may be utilized. Accordingly, even after the lapse of long period of time, the drum type washing machine of the present invention has little risk of damage to connecting regions between the damper fixing units 50 and the bottom plate 40 or peripheral regions around the cut portions 53 and 54 of the bottom plate 40.

The reinforcing portions 55 and 56 and reinforcing ribs 57 can be simultaneously formed in the course of forming the damper fixing unit 50 to the bottom plate 40 by a conventional press machining process, and therefore, can be fabricated without an additional fabrication process therefor. This has the effect of significantly reinforcing the rigidity of peripheral regions around the damper fixing units 50.

As apparent from the above description, the present invention provides a drum type washing machine in which each cut portion of a bottom plate of a washing machine body remaining after forming a damper fixing unit is provided, along a periphery thereof with a reinforcing portion, thereby achieving an increase in a rigidity around the cut portion of the bottom plate as well as the damper fixing unit. Accordingly, even if a relatively large load or shock is applied to the damper fixing unit, it is possible to prevent damage to the damper fixing unit and a surrounding region thereof.

Further, as a result of integrally forming the reinforcing portion around the cut portion in the course of forming the damper fixing unit to the bottom plate of the body, it is possible to achieve an improved reinforcement in the rigidity around the damper fixing unit without additional fabrication process and costs.

The present invention may be applied to other types of washing machines, drying machines or machines having both the washing and drying capabilities as well as the disclosed drum type washing machine.

Although the embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A drum type washing machine comprising:
   a body;
   a water tub installed in the body;
   at least one damper to support the water tub; and
   a damper fixing unit formed via cutting of a bottom plate of the body to secure the damper at a fixed position, the damper fixing unit including a reinforcing portion reinforcing rigidity of the damper fixing unit, the reinforcing portion including a reinforcing piece extended along a remaining portion of the bottom plate normal to an insertion position of the damper and formed around a cut portion defined within the reinforcing piece and between the reinforcing piece and the remaining portion of the bottom plate, and a fixing piece bent from the reinforcing piece at a periphery of the cut portion to protrude upward from an upper surface of the remaining portion of the bottom plate.

2. The washing machine according to claim 1, wherein the reinforcing portion is formed by bending a peripheral portion around the cut portion to have a height larger than a thickness of the bottom plate, and is integrally formed with the damper fixing unit.

3. The washing machine according to claim 2, wherein the fixing pieces of the reinforcing portion is cut from the bottom plate and bent upward to support a lower end of the damper, the fixing piece having a hole for the penetration of a fixing bolt.

4. The washing machine according to claim 3, wherein reinforcing ribs are formed at connecting portions between first and second fixing pieces and the bottom plate, respectively, beneath the insertion position of the damper.

5. The washing machine according to claim 1, wherein the reinforcing portion is integrally formed with the damper fixing unit.

6. The washing machine according to claim 5, wherein the fixing pieces of the reinforcing portion is cut from the bottom plate and bent upward to support a lower end of the damper, the fixing piece having a hole for the penetration of a fixing bolt.

7. The washing machine according to claim 6, wherein reinforcing ribs are formed at connecting portions between first and second fixing pieces of first and second reinforcing portions and the bottom plate, respectively.

8. The washing machine according to claim 7, wherein the reinforcing ribs are shaped in the form of a pyramid.

9. The washing machine according to claim 7, wherein the reinforcing ribs are shaped in the form of a quarter of a sphere.

10. The washing machine according to claim 7, wherein the reinforcing ribs are shaped in the form of an half cylinder.

11. The washing machine according to claim 1, wherein the reinforcing portion is formed around the entire periphery of the cut portion.

12. The washing machine according to claim 1, wherein the reinforcing portion is formed around a portion of the periphery of the cut portion.

13. The washing machine according to claim 1, wherein the reinforcing portion has a height substantially equal to the thickness of the bottom plate.

14. A clothes washing and/or drying machine comprising:
a body;
a tub installed in the body;
at least one damper to support the tub; and
a damper fixing unit formed via cutting of a bottom plate of the body to secure the damper at a fixed position, the damper fixing unit including a reinforcing portion reinforcing rigidity of the damper fixing unit, the reinforcing portion including a reinforcing piece extended along a remaining portion of the bottom plate normal to an insertion position of the damper and formed around a cut portion defined within the reinforcing piece and between the reinforcing piece and the remaining portion of the bottom plate, and a fixing piece bent upward from the periphery of the cut portion of the remaining portion of the bottom plate.

15. The clothes washing and/or drying machine according to claim 14, wherein the damper fixing unit includes first and second fixing pieces.

16. The clothes washing and/or drying machine according to claim 15, wherein the damper fixing unit is provided with holes for receiving a bolt.

17. The clothes washing and/or drying machine according to claim 15, wherein the reinforcing portion has a height greater than the thickness of the bottom plate.

18. The clothes washing and/or drying machine according to claim 17, further comprising reinforcing ribs formed in the connecting portion of the first and second fixing pieces.

19. The clothes washing and/or drying machine according to claim 18, wherein the reinforcing ribs are formed in the shape of a pyramid.

* * * * *

UNITED STATES PATENT AND TRADEMARK OFFICE
CERTIFICATE OF CORRECTION

PATENT NO. : 7,739,890 B2 Page 1 of 1
APPLICATION NO. : 11/509627
DATED : June 22, 2010
INVENTOR(S) : Hong Yeol Lee et al.

It is certified that error appears in the above-identified patent and that said Letters Patent is hereby corrected as shown below:

Column 5, Line 18, change "pieces" to --piece--.

Column 5, Line 30, change "pieces" to --piece--.

Signed and Sealed this

Seventh Day of December, 2010

David J. Kappos
*Director of the United States Patent and Trademark Office*